J. E. A. THOLLANDER.
ENVELOP FASTENER.
APPLICATION FILED JAN. 5, 1909.
929,344.  Patented July 27, 1909.
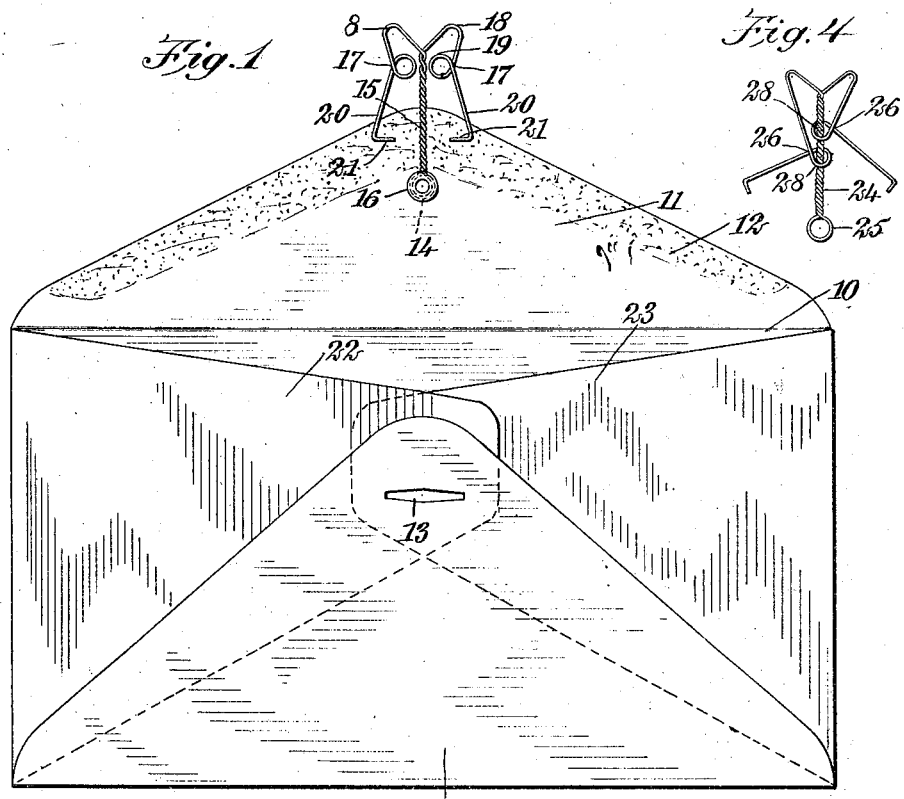
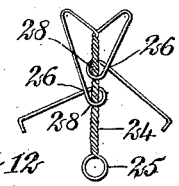
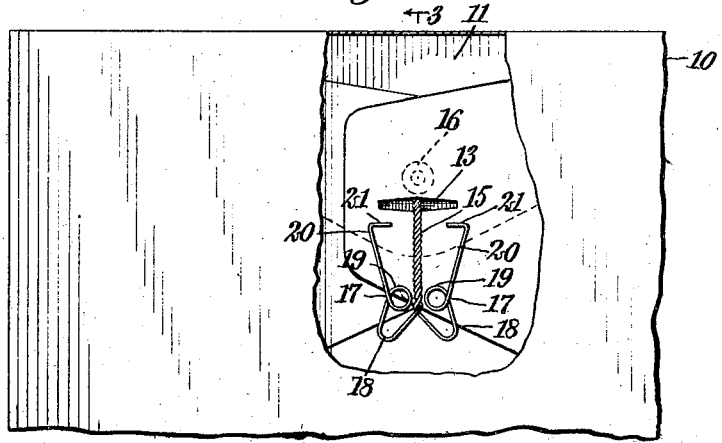
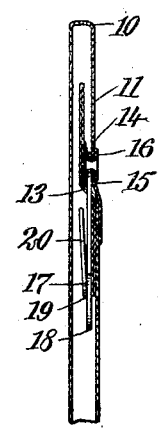
WITNESSES
INVENTOR
John E. A. Thollander
BY
ATTORNEYS

UNITED STATES PATENT OFFICE.

JOHN E. A. THOLLANDER, OF PIEDMONT, FLORIDA.

ENVELOP-FASTENER.

No. 929,344.     Specification of Letters Patent.     Patented July 27. 1909.

Application filed January 5, 1909. Serial No. 470,831.

*To all whom it may concern:*

Be it known that I, JOHN E. A. THOLLANDER, a citizen of the United States, and a resident of Piedmont, in the county of Orange and State of Florida, have invented a new and Improved Envelop-Fastener, of which the following is a full, clear, and exact description.

This invention relates to envelop fasteners, and more particularly to a device of this kind adapted to suitably attach to the envelop flap, and having divergent resilient arms adapted to be inserted through a slit in the body or back of the envelop, the arms being normally separated a distance exceeding the width of the slit in the envelop, so that the fastener can be compressed when being inserted through the slit, and after this has taken place, spreads into a normal position which renders its withdrawal through the slit impossible without tearing the envelop.

An object of the invention is to provide a simple, compact and durable fastener for envelops, which can be applied to any common form of envelop, which prevents the unauthorized opening of the envelop without leaving traces of such an act, which is inexpensive to manufacture, and which adds but very slightly to the weight or bulkiness of the envelop.

A further object of the invention is to provide a device of the class described which does not prevent the envelop being closed or sealed in any preferred or common manner by means of an adhesive, sealing wax or the like, which is almost entirely concealed within the envelop when in use, and which is so formed that it is very difficult to insert an instrument through the slit in the back, to compress the arms and remove the fastener, without rupturing the envelop itself.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a rear view of an envelop having an embodiment of my invention applied thereto and showing the envelop open; Fig. 2 is a front view of an envelop closed by means of my fastener and having a part broken away to show the fastener; Fig. 3 is a transverse section on the line 3—3 of Fig. 2; and Fig. 4 is an elevation of a fastener of modified form.

Before proceeding to a more detailed explanation of my invention it should be clearly understood that while the same is particularly useful as a fastener for envelops, it can also be advantageously applied to any other similar device wherein it is necessary or desirable to attach a closing flap to the body of the device, so that an unauthorized opening is impossible without leaving traces of such opening. The fastener is preferably fashioned from thin resilient material such as suitably plated or painted steel wire, so that the parts of the fastener have a natural or normal resiliency, for a purpose which will appear more clearly hereinafter. In the accompanying drawings, I have shown the fastener secured to the flap of an envelop by means of an eye-rivet. Needless to say this constructive detail, as well as others, can be varied in accordance with special conditions and individual preference, without departing from the underlying spirit of the invention.

Referring more particularly to the drawings, 10 represents an envelop of common form having a closing flap 11 provided at the edge with mucilage 12 or other adhesive, to permit the flap to be glued in place to close the envelop. In the back of the latter is fashioned a slit 13 preferably tapering toward the ends and piercing the three back flaps 22, 23 and 24. The fastener is formed from wire doubled upon itself and forming an eye 14 at one end of a shank 15, the latter being fashioned by twisting the wire. The eye receives a rivet 16 by means of which the shank is securely attached to the flap.

The ends of the wire are rearwardly disposed to form divergent arms 17 each having at the end adjacent to the shank an outwardly disposed V-shaped part 18 and each formed into a loop or coil 19. The outer ends 20 of the arms are divergent and have the extremities 21 inwardly disposed. The coils 19 add materially to the normal resiliency of the arms, and the inwardly disposed extremities 21 permit the arms to be grasped between the fingers without the possibility of abrading the fingers owing to sharp points at the ends of the arms. To close or seal the envelop the flap is folded down and the fastener is inserted through the slit 13, the parts 18 being spaced a distance such that they can be inserted through the slit. The ends 20 of the arms are forced toward each other by grasping them between the fingers and compressing the same, so that the entire fastener can pass through the slit. It will be understood that the ends 20 at the extremities are normally spaced apart a distance exceeding the length of the slit. When the fastener is within the envelop it cannot be removed through the slit, owing to the fact that the arms 17 have spread so that they cannot be withdrawn through the slit without tearing the envelop.

After the envelop is closed with the fastener inserted in the slit 13 it is possible to slide the closing flap upward, provided it is not glued, so that the shank 15 is moved through the slit until the V-shaped parts and the coils of the arms engage at the slit. This displacing of the closing flap causes openings to form at the ends of the envelop through which an instrument can be inserted to compress the ends 20 of the device. However, the provision of the V-shaped parts prevents the withdrawal of the fastener despite the fact that the instrument can be inserted and used as mentioned.

In Fig. 4 is shown a modified form of my fastener which has a shank 24, an eye 25 and divergent arms 26. The construction is similar to that shown in the other figures, with the exception that the loops or coils 28 which correspond to the coils 19 engage the shank 24, otherwise the parts are similar in each case. This arrangement of the coils renders it even more difficult to open an envelop closed by means of my fastener, without leaving traces of said opening.

Having thus described my invention, I claim as new, and desire to secure by Letters Patent:

1. A device of the class described adapted to be secured to a closing flap of an envelop and to be inserted bodily through a slit in the envelop, and comprising a member having rearwardly disposed divergent resilient arms, the distance between the free ends of said arms being greater than the length of the slit, each of said arms being of V-shape.

2. A device of the class described adapted to be secured to a closing flap of an envelop and to be inserted through a slit in the envelop, comprising a shank having at the free end, oppositely disposed divergent arms, said arms being resilient and tending to maintain a normal distance between the ends thereof in excess of the length of the slit, said arms extending rearwardly from the free end of said shank, and consisting of relatively inclined parts.

3. A device of the class described adapted to be secured to a closing flap of an envelop and to be inserted through a slit in the envelop, comprising a shank secured to the flap and having at the free end opposite arms, each of said arms having a coil encompassing said shank.

4. A device of the class described adapted to be secured to a closing flap of an envelop and to be inserted through a slit in the envelop, comprising a shank secured to the flap and having at the free end oppositely disposed divergent and resilient arms, each of said arms having intermediate its ends a coil encompassing said shank.

5. A device of the class described adapted to be secured to a closing flap of an envelop and to be inserted through a slit in the envelop, comprising a shank having at the free end V-shaped arms rearwardly disposed and divergent, said arms being resilient and having the ends normally spaced a distance exceeding the length of the slit.

6. A device of the class described adapted to be secured to a closing flap of an envelop and to be inserted through a slit in the envelop, comprising a shank fastened to the flap at one end and at the other end having arms, said arms adjacent to the shank having divergent V-shaped parts and having the free ends divergent, each of said arms having its V-shaped part and its end oppositely divergent, the distance between the extremities of said ends exceeding the length of the slit.

7. A device of the class described adapted to be secured to a closing flap of an envelop and to be inserted through a slit in the envelop, comprising a shank secured to the flap and having at the free end opposite arms, each of said arms comprising at the end adjacent to the outer end of said shank a V-shaped part, a coil, and an end having the extremity inwardly disposed, said ends being spaced at the free extremities a distance exceeding the length of the slit.

8. A device of the class described adapted to be secured to a closing flap of an envelop and to be inserted through a slit in the envelop, comprising a member having resilient arms at opposite sides, each of said arms comprising outwardly and oppositely disposed parts and having a free end, said parts being forced away from one another when said free ends of said arms are forced toward each other.

In testimony whereof I have signed my name to this specification in the presence of two subscribing witnesses.

JOHN E. A. THOLLANDER.

Witnesses:
 H. H. WITHERINGTON,
 JONAS LARSSON.